US010671442B2

(12) United States Patent
Foster, Jr. et al.

(10) Patent No.: US 10,671,442 B2
(45) Date of Patent: Jun. 2, 2020

(54) DYNAMIC PREPARATION OF A NEW NETWORK ENVIRONMENT, AND SUBSEQUENT MONITORING THEREOF

(71) Applicant: Red Hat, Inc., Raleigh, NC (US)

(72) Inventors: William W. Foster, Jr., Dublin (IE); Kambiz Aghaiepour, Raleigh, NC (US); Joseph D. Talerico, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 146 days.

(21) Appl. No.: 15/813,728

(22) Filed: Nov. 15, 2017

(65) Prior Publication Data
US 2019/0146852 A1 May 16, 2019

(51) Int. Cl.
*G06F 9/50* (2006.01)
*H04L 12/24* (2006.01)

(52) U.S. Cl.
CPC .......... *G06F 9/5077* (2013.01); *G06F 9/5027* (2013.01); *H04L 41/0886* (2013.01); *H04L 41/28* (2013.01); *H04L 41/0816* (2013.01); *H04L 41/50* (2013.01)

(58) Field of Classification Search
CPC ..... G06F 9/5077; G06F 9/5027; H04L 41/28; H04L 41/0886; H04L 41/0816; H04L 41/50
See application file for complete search history.

(56) References Cited

U.S. PATENT DOCUMENTS

| 9,100,297 | B2 | 8/2015 | DeHaan | |
|---|---|---|---|---|
| 9,317,337 | B2 | 4/2016 | Anderson et al. | |
| 10,127,068 | B2 * | 11/2018 | Liguori | G06F 9/5077 |
| 2003/0084278 | A1 * | 5/2003 | Cromer | G06F 9/4406 713/2 |
| 2004/0078679 | A1 * | 4/2004 | Cagle | G06F 9/4406 714/36 |
| 2009/0113198 | A1 * | 4/2009 | Liu | H04L 41/0803 713/2 |

(Continued)

OTHER PUBLICATIONS

Author Unknown, "Provisioning Bare Metal Servers," Administrator's Guide, Release 5, Chapter 36, 2017, Oracle, 31 pages.

(Continued)

*Primary Examiner* — Michael Won
(74) *Attorney, Agent, or Firm* — Withrow & Terranova, PLLC

(57) ABSTRACT

Dynamic preparation of a new network environment, and subsequent monitoring thereof is disclosed. It is automatically determined that a new network environment is designated for creation. A subset of computing hosts is identified from a pool of computing hosts for the new network environment. Network provisioning metadata for each computing host is determined. The network provisioning metadata for each computing host includes a communication address of a baseboard management controller that controls the computing host, and authentication credentials that authorize communication with the baseboard management controller. The network provisioning metadata is stored on a storage device in a predetermined format associated with a network environment provisioner.

20 Claims, 8 Drawing Sheets

(56) References Cited

U.S. PATENT DOCUMENTS

| | | | |
|---|---|---|---|
| 2009/0216910 A1* | 8/2009 | Duchesneau | G06F 9/5072 709/250 |
| 2011/0153727 A1* | 6/2011 | Li | G06F 9/5055 709/203 |
| 2013/0204849 A1* | 8/2013 | Chacko | G06F 3/0604 707/692 |
| 2015/0178137 A1 | 6/2015 | Gordon et al. | |
| 2015/0381711 A1 | 12/2015 | Singh et al. | |
| 2016/0164723 A1* | 6/2016 | Cimprich | H04L 41/0806 709/221 |
| 2016/0191308 A1 | 6/2016 | Berry | |
| 2017/0155620 A1 | 6/2017 | Bar David | |
| 2019/0146852 A1* | 5/2019 | Foster, Jr. | G06F 9/5077 |
| 2019/0266274 A1* | 8/2019 | Olarig | G06F 3/0679 |

OTHER PUBLICATIONS

Rad, Paul, et al., "Benchmarking Bare Metal Cloud Servers for HPC Applications," International Conference on Cloud Computing in Emerging Markets, Nov. 2015, IEEE, 8 pages.

* cited by examiner

DYNAMIC PREPARATION OF A NEW NETWORK ENVIRONMENT, AND SUBSEQUENT MONITORING THEREOF

TECHNICAL FIELD

The examples relate generally to network environments, and in particular to the dynamic preparation of a new network environment and the subsequent monitoring thereof.

BACKGROUND

For testing and other purposes, it is often desirable to generate an isolated network environment of computing hosts. In a development environment, multiple different network environments may be needed at different times, or at the same time, on a continuing basis. Generating a network environment involves configuration of switches and computing hosts, and can be time-consuming, and a single input error by an operator can lead to configuration problems.

SUMMARY

The examples relate to the dynamic, and automatic, preparation of a new network environment, and the subsequent monitoring thereof. In particular, the examples automatically, without human involvement, prepare a subset of computing hosts of a plurality of computing hosts for forming a new network environment. The examples generate network provisioning metadata in a predetermined format suitable for use by a network environment provisioner. After the network environment is generated, the examples monitor network environment metadata associated with the network environment to determine if any changes to the network environment metadata occur. If the network environment metadata changes, the examples automatically generate new network provisioning metadata that reflects the change in the network environment metadata, and notifies a user that the new network provisioning metadata has been generated. The user may then use the new network provisioning metadata to generate a new network environment that implements the changes identified in the network environment metadata.

In one example a method is provided. The method includes automatically determining that a new network environment is designated for creation. The method further includes identifying a subset of computing hosts from a pool of computing hosts for the new network environment. The method further includes determining network provisioning metadata for each computing host of the subset of computing hosts. The network provisioning metadata for each computing host includes a communication address of a baseboard management controller that controls the computing host and includes authentication credentials that authorize communication with the baseboard management controller. The method further includes storing, on a storage device, the network provisioning metadata in a predetermined format associated with a network environment provisioner.

In another example a computing device is provided. The computing device includes a memory and a processor device coupled to the memory. The processor device is to automatically determine that a new network environment is designated for creation. The processor device is further to identify a subset of computing hosts from a pool of computing hosts for the new network environment. The processor device is further to determine network provisioning metadata for each computing host of the subset of computing hosts. The network provisioning metadata for each computing host includes a communication address of a baseboard management controller that controls the computing host and includes authentication credentials that authorize communication with the baseboard management controller. The processor device is further to store, on a storage device, the network provisioning metadata in a predetermined format associated with a network environment provisioner.

In another example a computer program product is provided. The computer program product is stored on a non-transitory computer-readable storage medium and includes instructions to cause a processor device to automatically determine that a new network environment is designated for creation. The instructions further cause the processor device to identify a subset of computing hosts from a pool of computing hosts for the new network environment. The instructions further cause the processor device to determine network provisioning metadata for each computing host of the subset of computing hosts. The network provisioning metadata for each computing host includes a communication address of a baseboard management controller that controls the computing host and includes authentication credentials that authorize communication with the baseboard management controller. The instructions further cause the processor device to store, on a storage device, the network provisioning metadata in a predetermined format associated with a network environment provisioner.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
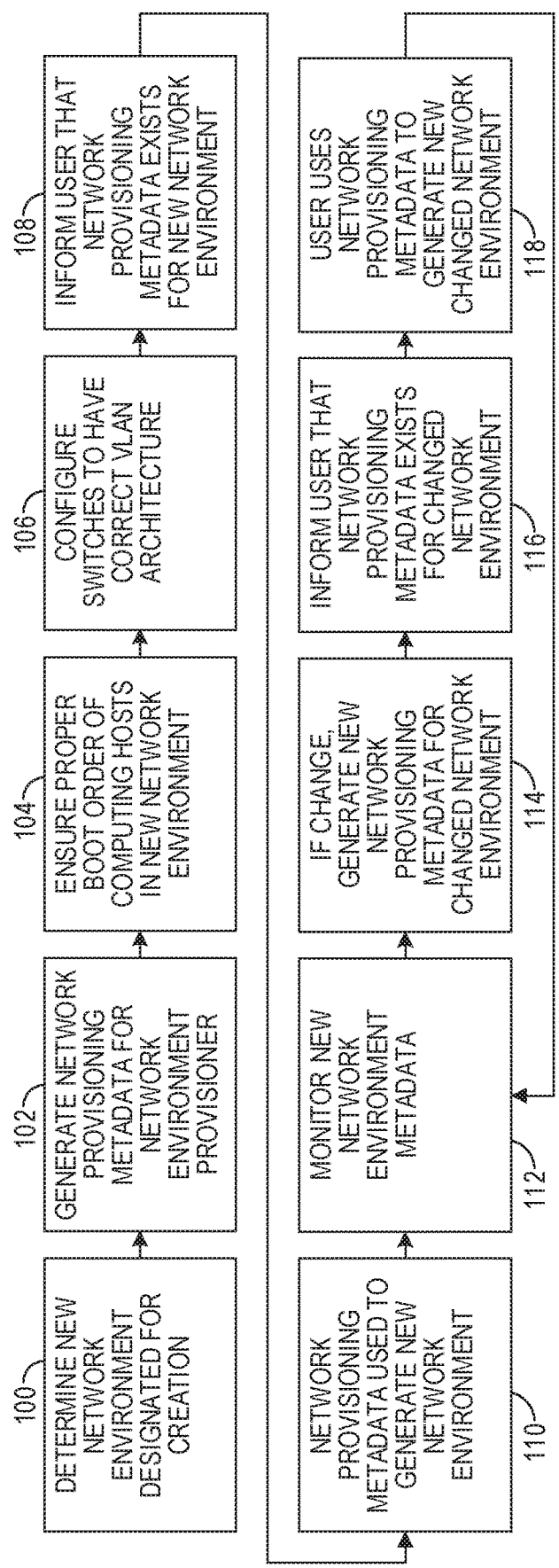
FIG. 1 is a block diagram illustrating a high-level functional sequence for generating network environment metadata according to some examples.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first network interface" and "second network interface," and does not imply a priority, a type, an importance, or other attribute, unless otherwise stated herein. As used herein and in the claims, the articles "a" and "an" in reference to an element refers to "one or more" of the element unless otherwise explicitly specified. As used throughout the specification and claims, the term "automatically" refers to functionality that is performed without direct initiation by or direct involvement from a human.

A company may maintain a finite number of test computing resources, such as a pool of computing hosts, which can be used for testing purposes, or other purposes, by employees. For example, before a new software release is rolled out to customers, a software development team may want to utilize some of the computing hosts to test the new software release and ensure that the new software release is stable. While the development team is using those computing hosts, the computing hosts are unavailable to other employees. Yet, there may be a high demand by other employees in the company to utilize the pool of computing hosts.

Configuring the pool of computing hosts into multiple different network environments in response to the demands of teams of employees requires a substantial and relatively rapid amount of configuration of computing hosts and network equipment, such as switches, for each new network environment. In a large research and development context, such as in the context of a software development company, the pool of computing resources may include hundreds of computing hosts, and hundreds of network switches, many of which may need to be configured for each new network environment. This requires substantial manpower. Moreover, with such a large, diverse, and changing environment, there is also a chance of human error caused by the substantial amount of configuration changes that are continually needed.

The examples herein reduce the amount of time necessary to create a new network environment from a group of computing hosts and corresponding switches. In particular, the examples automatically and dynamically recognize that a new network environment is to be created, and automatically, without human intervention, initiate changes to the computing hosts and switches to prepare the computing hosts and switches for the new network environment. The examples also automatically generate network provisioning metadata in a format suitable for a downstream network provisioner to create the new network environment.

The examples also monitor network environment metadata associated with the new network environment after the new network environment has been created. Upon detection of a change in the network environment metadata, the examples automatically generate new network provisioning metadata that reflects the change in the network environment metadata, and notifies a user that the new network provisioning metadata has been generated. The user may then provide the new network provisioning metadata to the network provisioner to implement the changes in the network environment.

Among other advantages, the examples eliminate a need for one or more humans to manually configure a network environment, and thus greatly reduce the manpower required to implement network environments from a pool of computing resources, and also ensure that each network environment is configured accurately.

FIG. 1 is a block diagram illustrating a high-level functional sequence for generating network environment metadata according to some examples. FIG. 1 is provided to give context to the examples, and details of each functional block illustrated in FIG. 1 are provided with respect to subsequent figures discussed below. The examples will be discussed in the context of a software development company where many different groups of employees may periodically, or intermittently, have a need for a network environment to test, or debug, a software product. To that end, the software development company may maintain a pool of tens, hundreds, or even thousands of computing hosts, and tens, hundreds, or thousands of network devices, such as network switches, from which network environments may be created upon request.

Initially, a network environment preparer (NEP) determines that a new network environment is designated for creation (block 100). The NEP may make this determination in any number of ways, such as via receiving input from an operator, or by periodically analyzing a schedule that identifies times and dates that new network environments are to be created. The NEP generates network provisioning metadata in a predetermined format suitable for a network environment provisioner (block 102). In one example, the network environment provisioner is Ironic (github.com/openstack/ironic), a bare-metal provisioner used with OpenStack® (www.openstack.org) to create a cloud network environment, but the examples are not limited to any particular network environment provisioner. The network provisioning metadata may identify, for example, the subset of computing hosts that are to form the new network environment, and particular attributes of each such computing host, in a format that allows a user to simply provide the network provisioning metadata to the network environment provisioner to generate the new network environment.

The NEP also ensures a proper boot order sequence of each computing host in the new network environment (block 104). This ensures that each computing host will boot properly, for example, from a designated computer, such as a preboot execution environment (PXE) server, on which a desired software assembly has been loaded. The NEP configures the switches that are coupled to the subset of computing hosts to implement a particular virtual local area network (VLAN) architecture on the switches (block 106). The NEP may then generate and send a notification to the user designated as an owner of the new network environment that notifies the user that the network provisioning metadata has been generated (block 108). The network provisioning metadata may then be used to create/generate the new network environment (block 110). For example, the user may direct Ironic to use the network provisioning metadata to provision the subset of computing hosts.

The NEP then continually monitors network environment metadata associated with the new network environment (block 112). The network environment metadata may be in any number of different locations. If the NEP detects a change in the network environment metadata associated with the new network environment, the NEP generates new network provisioning metadata (block 114). The NEP informs the user that the new network provisioning metadata exists (block 116). The user may then provide the new network provisioning metadata to the network environment provisioner to implement the changes in the new network environment (block 118). This cycle of monitoring, generating new network provisioning metadata, and generating a new network environment may recur any number of times during the existence of the new network environment.

Figure 2:
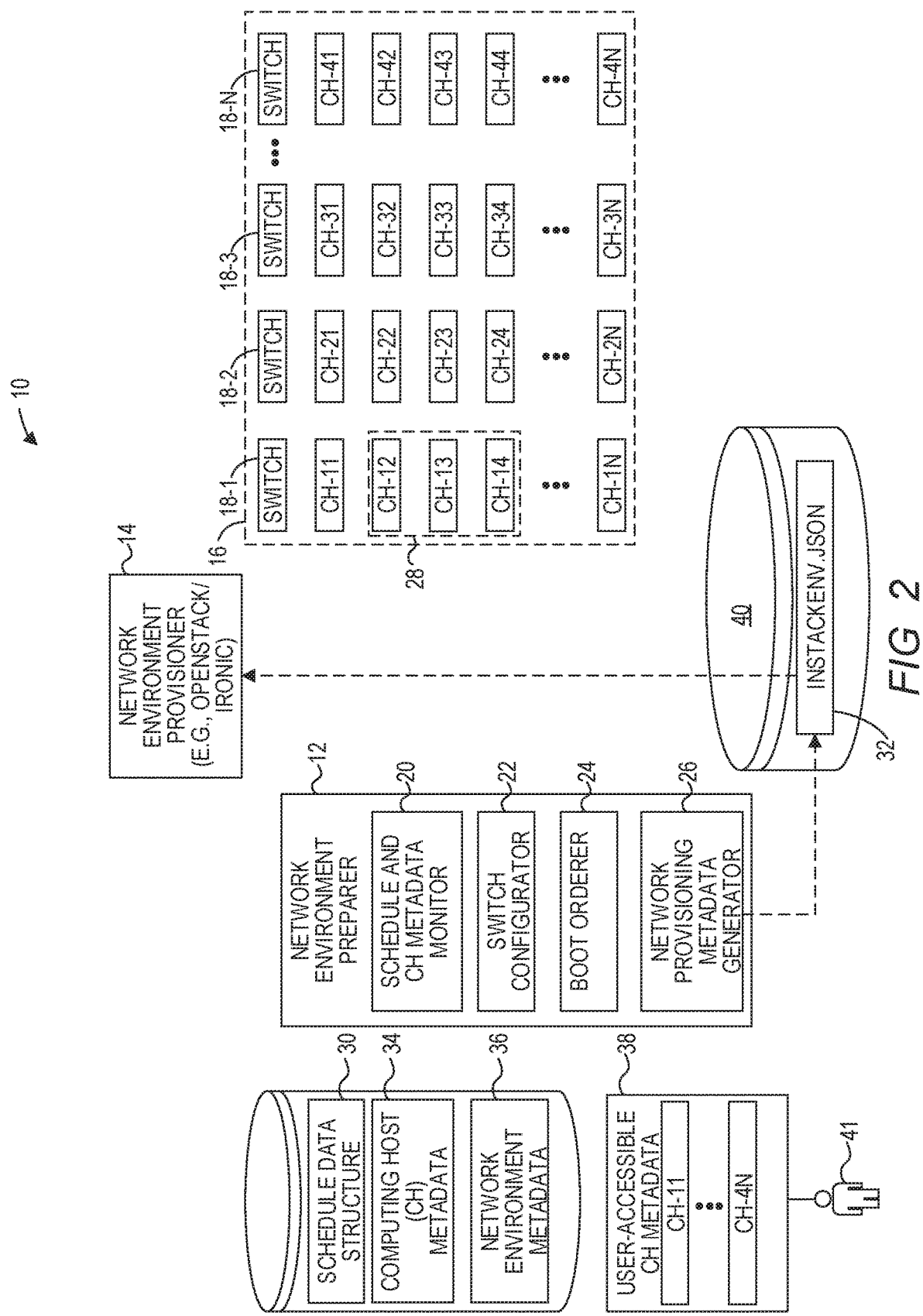
FIG. 2 is a block diagram of an environment in which aspects of the high-level functional sequence for generating network environment metadata described in FIG. 1 may be implemented according to some examples.

FIG. 2 is a block diagram of an environment 10 in which aspects of the high-level functional sequence for generating network environment metadata described in FIG. 1 may be implemented according to some examples. The environment 10 includes a network environment preparer 12 and a network environment provisioner 14. The environment 10 also includes a pool 16 of a plurality of computing resources, including a plurality of computing hosts CH and one or more switches 18-1-18-N. Individual computing hosts CH will be referred to by the labels in the drawings, such as the computing host CH-11 or the computing host CH-12. Each respective computing host CH includes a baseboard management controller that is configured to control the respective computing host CH. The baseboard management controller (BMC) is a service processor that monitors the physical state of the respective computing host CH and is configured to communicate via a network interface that is independent of the computing host CH. In some examples the BMC is part of the Intelligent Platform Management Interface (IPMI), and may be part of the motherboard or main circuit board of the corresponding computing host CH.

The pool 16 also includes a plurality of switches 18 that facilitate interconnection between the computing hosts CH, and which can be programmatically configured to implement local area networks, including VLANs, among the computing hosts CH as desired. In some examples, each switch 18 may be communicatively connected to each other switch 18, and may be directly connected to the computing hosts CH that are in the same rack as the respective switch 18. For example, the switch 18-1 and computing hosts CH-11, CH-12, CH-13, and CH-14-CH-1N may be in one rack, and the switch 18-1 and the computing hosts CH-11, CH-12, CH-13, and CH-14-CH-1N may be physically connected to one another. As another example, the switch 18-2 and the computing hosts CH-21, CH-22, CH-23, and CH-24-CH-2N may be in a different rack, and the switch 18-2 and the computing hosts CH-21, CH-22, CH-23, and CH-24-CH-2N may be physically connected to one another.

While for purposes of illustration and relative simplicity only twenty computing hosts CH are illustrated, the examples have applicability to pools of any number of computing hosts CH, such as hundreds or thousands of computing hosts CH. In the present examples, each computing host CH is a separate physical "bare metal machine," but the examples are not limited to bare metal machine computing resources.

For purposes of illustration and discussion, the network environment preparer 12 herein will be discussed in terms of functional blocks, including a schedule and computing host (CH) metadata monitor 20, a switch configurator 22, a boot orderer 24, and a network provisioning metadata generator 26. However, these functional processes are illustrated merely for discussing the overall functionality of the network environment preparer 12, and it will be apparent that the functionality discussed herein could be implemented in any number of functional processes and that the examples are not limited to the particular functional processes discussed herein. Additionally, because the network environment preparer 12 is a component of a computing device (not illustrated in FIG. 1), functionality implemented by the network environment preparer 12 may be attributed herein to the computing device generally. Moreover, in examples where the network environment preparer 12 comprises software instructions that program a processor device to carry out functionality discussed herein, functionality implemented by the network environment preparer 12 may be attributed herein to such processor device.

In one example the schedule and CH metadata monitor 20 of the network environment preparer 12 determines that a new network environment 28 is designated for creation. In one example, the schedule and CH metadata monitor 20 may make this determination by automatically monitoring a schedule data structure 30 over time. The schedule data structure 30 identifies a plurality of future points in time at which a corresponding plurality of new network environments, such as the new network environment 28, is to be generated. As an example, the schedule and CH metadata monitor 20 may scan the schedule data structure 30 periodically, such as every minute, or every five minutes, and determine that based on a current point in time and the schedule data structure 30, a new network environment is to be generated. Each new network environment includes one or more computing hosts CH, and one or more switches 18 that are coupled to the computing hosts CH.

The network environment preparer 12 identifies a subset of computing hosts CH from the pool 16 of computing hosts CH for the new network environment 28. In some examples, the computing hosts CH for each new network environment may be identified in the schedule data structure 30, and the network environment preparer 12 identifies the subset of computing hosts CH via the schedule data structure 30.

The network provisioning metadata generator 26 determines network provisioning metadata 32 for each computing host CH in the subset of computing hosts CH that will form the new network environment 28. The network provisioning metadata generator 26 may determine the network provisioning metadata 32 from any of a number of sources, including, for example, the schedule data structure 30, computing host metadata 34, network environment metadata 36, and user-accessible CH metadata 38. The network provisioning metadata 32 includes, for each computing host CH, a communication address of a baseboard management controller that controls the computing host CH and includes authentication credentials that authorize communication with the baseboard management controller. The network provisioning metadata generator 26 stores the network provisioning metadata 32 on a storage device 40 in a predetermined format associated with the network environment provisioner 14.

The network provisioning metadata generator 26 may also determine a designated user 41 that is an owner of the new network environment 28, and send a notification to the user 41 that the new network environment 28 is prepared and ready to be generated by the network environment provisioner 14. In some examples, the network provisioning metadata generator 26 generates a link that refers to the network provisioning metadata 32, and includes the link in the notification. This notification may occur after additional actions have been taken by the network environment preparer 12, including actions described below taken by the switch configurator 22 and the boot orderer 24.

The switch configurator 22 determines at least one switch 18 that is coupled to the subset of computing hosts CH, and determines a particular virtual local area network (VLAN)

architecture that is designated for the new network environment 28. The switch configurator 22 initiates one or more commands to the switch 18 to configure the switch 18 to have the designated VLAN architecture.

The boot orderer 24, for at least some of the computing hosts CH, determines a current boot order of a plurality of network interfaces of the computing host CH that determines from which network interface of the plurality of network interfaces the computing host CH will boot. If the boot orderer 24 determines that a preferred boot order of the plurality of network interfaces differs from the current boot order, the boot orderer 24 initiates a boot order rearrangement process to change the current boot order of the plurality of network interfaces to make the current boot order the preferred boot order.

Figure 3:
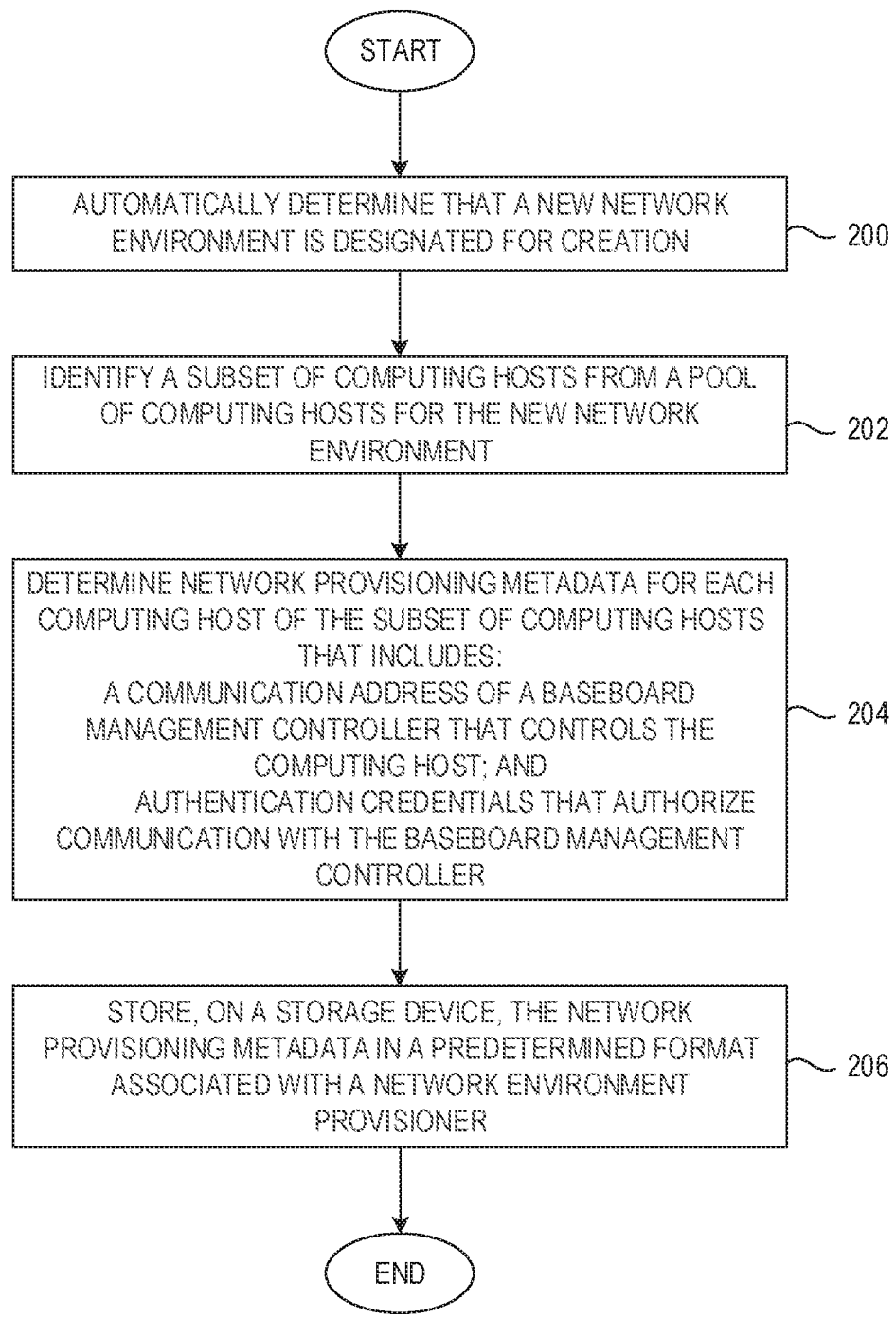
FIG. 3 is a flowchart of a method for automatically generating network provisioning metadata according to one example.

FIG. 3 is a flowchart of a method for automatically generating the network provisioning metadata 32 according to one example. FIG. 3 will be discussed in conjunction with FIG. 2. The network environment preparer 12 automatically determines that the new network environment 28 is designated for creation (FIG. 2, block 200). As discussed above, this determination, in some examples, may be made based on the schedule data structure 30. The network environment preparer 12 identifies a subset of computing hosts CH-12, CH-13, and CH-14 from the pool 16 of computing hosts CH for the new network environment 28 (FIG. 2, block 202). The network environment preparer 12 determines the network provisioning metadata 32 for each computing host CH-12, CH-13, and CH-14. The network provisioning metadata 32 includes, for each computing host CH-12, CH-13, and CH-14, a communication address of a baseboard management controller that controls the computing host CH and authentication credentials that authorize communication with the baseboard management controller (FIG. 2, block 204). The network environment preparer 12 stores, on the storage device 40, the network provisioning metadata 32 in a predetermined format associated with the network environment provisioner 14 (FIG. 2, block 206).

Figure 4:
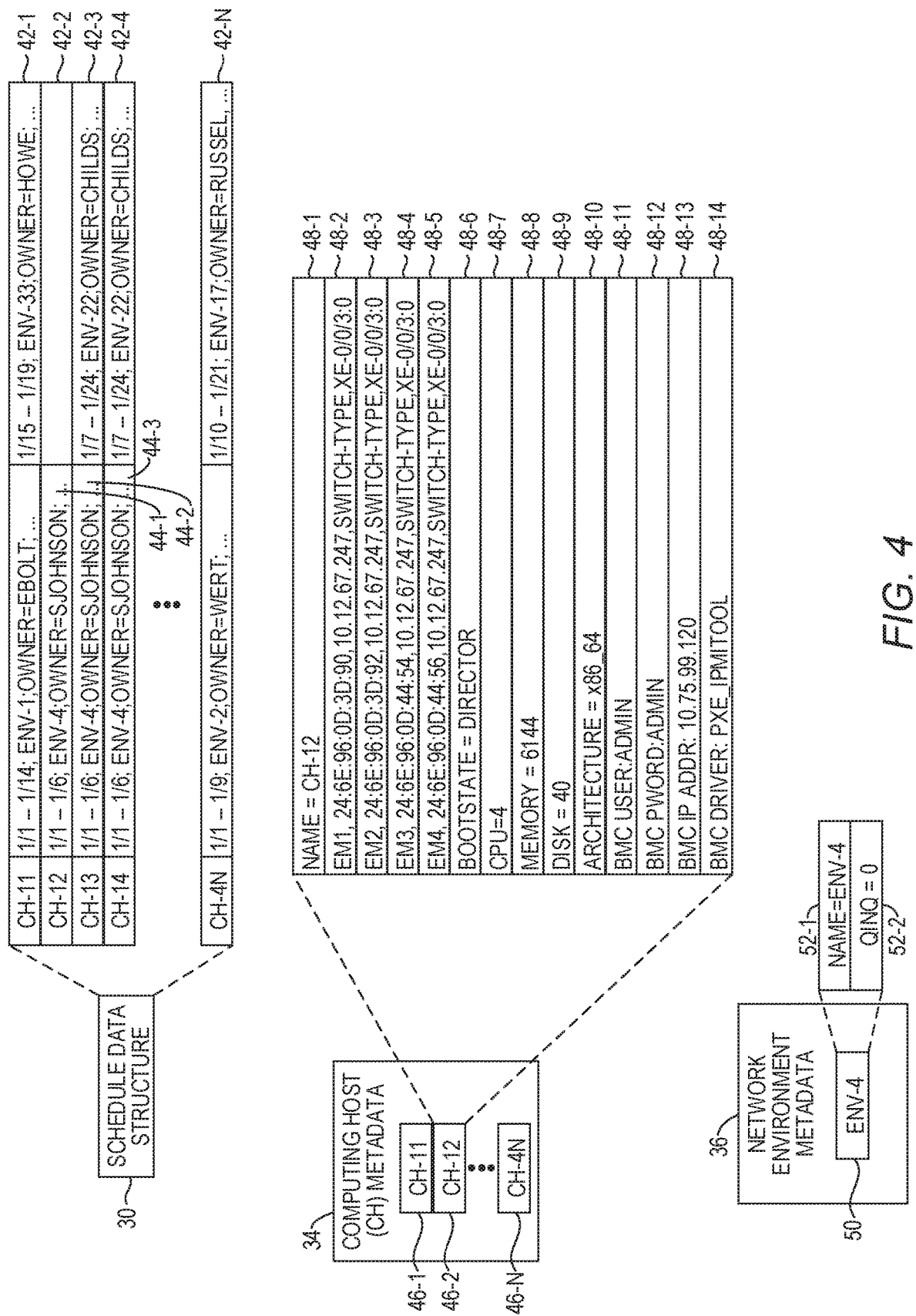
FIG. 4 is a block diagram illustrating various data structures depicted in FIG. 2 in greater detail according to some examples.

FIG. 4 is a block diagram illustrating various data structures depicted in FIG. 2 in greater detail according to some examples. The example schedule data structure 30 includes an entry 42 for each computing host CH in the pool 16. Solely for purposes of illustration, only five entries 42-1-42-N, which correspond respectively to computing hosts CH-11, CH-12, CH-13, CH-14, and CH-4N, are shown. In this example, the entries 42-2, 42-3, and 42-4 include network environment records 44-1, 44-2, and 44-3, respectively, which contain scheduling information that identifies dates and a particular network environment that each of the computing hosts CH-12, CH-13, and CH-14 will be a part of on such dates. Note that although not illustrated, the network environment records 44-1, 44-2, and 44-3 may also indicate times for such network environments. In this example, the network environment records 44-1, 44-2, and 44-3 indicate that from January 1 through January 6, the computing hosts CH-12, CH-13, and CH-14 will be part of a network environment named "ENV-4", and that a user identified as "SJOHNSON" is designated as the owner of the network environment.

In operation, the network environment preparer 12 may scan the schedule data structure 30 periodically, such as every minute. When the network environment preparer 12 identifies that the current time matches a time in a network environment record 44 that identifies a new network environment, the network environment preparer 12 begins to initiate the network preparation for the new network environment, including, for example, the network preparation undertaken by the schedule and CH metadata monitor 20, the switch configurator 22, and the boot orderer 24, as discussed above with regard to FIG. 2.

The computing host metadata 34 contains a corresponding entry 46-1-46-N for each computing host CH. The entry 46-2 corresponds to the computing host CH-12. The entry 46-2 includes metadata 48-1 which identifies the name of the computing host CH-12. Metadata 48-2-48-5 correspond to network interfaces of the computing host CH-12. The metadata 48-2 indicates that a first network interface has a name of "EM1", has a MAC address of 24:6E:96:0D:3D:90, is controlled via a network switch at IP address 10.12.67.247, and has a switch type of "SWITCH-TYPE" (this may be used to identify a particular brand of switch, for example), and indicates that "XE-0/0/3:0" is the name of the physical port on the network switch where the EM1 network interface is connected to, which facilitates corresponding automation to be performed on that particular port for its respective settings. Metadata 48-3-48-5 contain similar information for other corresponding network interfaces of the computing host CH-12.

Metadata 48-6 identifies a particular boot order of the network interfaces identified in the metadata 48-2-48-5. In particular, the boot order will identify which network interface is booted first. In this example the boot order is identified via a keyword "DIRECTOR", which indicates a predetermined boot order known to the network environment preparer 12, however, the boot order may be identified by any desired means. The metadata 48-7 identifies the number of CPUs of the computing host CH-12. The metadata 48-8 identifies the size of the memory, in megabytes, of the computing host CH-12. The metadata 48-9 identifies the size of the disk, in gigabytes, of the computing host CH-12. The metadata 48-10 identifies an architecture of the computing host CH-12 (in this example, an Intel x86_64 architecture). The metadata 48-11 identifies a user identifier for the BMC of the computing host CH-12. The metadata 48-12 identifies a password for the BMC of the computing host CH-12. The metadata 48-13 identifies an IP address of the switch that controls the computing host CH-12. The metadata 48-14 identifies a particular driver for the BMC of the computing host CH-12. As will be discussed in greater detail with regard to FIG. 5, the network environment preparer 12 utilizes the computing host metadata 34 to generate the schedule data structure 30.

The network environment metadata 36 includes entries 50, only one entry 50 being illustrated herein, for the network environments. In this example, the entry 50 corresponds to the new network environment 28 illustrated in FIG. 2, and identified in the network environment records 44-1, 44-2, and 44-3 of the entries 42-2-42-4 of the schedule data structure 30. The entry 50 contains metadata 52-1 that identifies the name "ENV-4" of the network environment 28 and metadata 52-2 that identifies a VLAN architecture of the new network environment 28. In this example, the VLAN architecture is QINQ=0. In this example, QINQ=0 refers to a VLAN architecture wherein a separate VLAN is generated for each network interface across the computing hosts CH-12, CH-13, and CH-14. In this example, there would be four VLANS for the computing hosts CH-12, CH-13, and CH-14: one VLAN on the first network interface "EM1" of each computing host CH-12, CH-13, and CH-14, one VLAN on the second network interface "EM2" of each computing host CH-12, CH-13, and CH-14, one VLAN on the third network interface "EM3" of each computing host CH-12, CH-13, and CH-14, and one VLAN on the fourth network interface "EM4" of each computing host CH-12, CH-13, and CH-14. Another VLAN architecture is identified by QINQ=1, wherein all network interfaces of each computing host CH-12, CH-13, and CH-14 are on the same, single, VLAN. The switch configurator 22 accesses the metadata 52-2 to determine the VLAN architecture.

In particular, the switch configurator 22 determines the designated VLAN architecture from the entry 50, and then initiates one or more commands to the switch 18-1, in this example, to configure the switch 18-1 to have the designated VLAN architecture.

Figure 5:
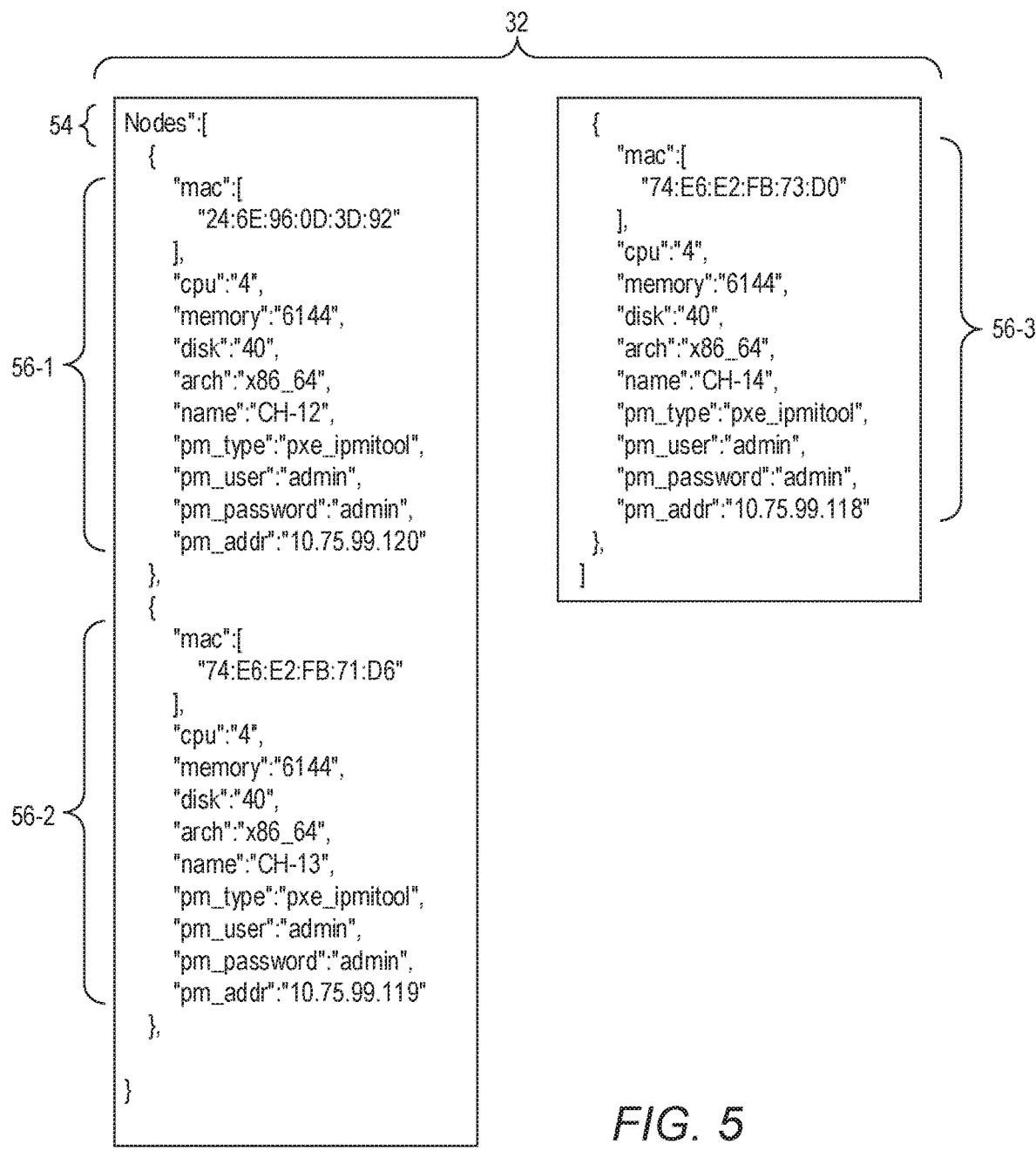
FIG. 5 is a block diagram of network provisioning metadata according to one example.

FIG. 5 is a block diagram of the network provisioning metadata 32 according to one example. In this example, the network provisioning metadata 32 is in a predetermined format associated with the OpenStack® Ironic network environment provisioner 14; however, the examples are not limited to any particular predetermined format.

The network provisioning metadata 32 includes a keyword 54 "Nodes". Three entries 56-1-56-3 identify the computing hosts CH-12-CH-14 that will form the new network environment 28. The entry 56-1 includes the MAC address of the network interface of the computing host CH-12 that the network environment provisioner 14 is to use to provision the computing host CH-12. The entry 56-1 also includes, for example, the number of CPUs on the computing host CH-12, the amount of memory on the computing host CH-12, the size of the disk on the computing host CH-12, the architecture of the computing host CH-12, the user identifier and the password for the BMC of the computing host CH-12, and the IP address used to control the computing host CH-12. This information may be determined by the network environment preparer 12 from the computing host metadata 34, for example.

Entries 56-2 and 56-3 include corresponding information for the computing hosts CH-13 and CH-14, respectively. After the network provisioning metadata 32 is generated by the network environment preparer 12, the network environment preparer 12 may store the network provisioning metadata 32 at a location that is referenced by a link accessible by a user, such as the user 41. The network environment preparer 12 may then generate and send a notification to the user 41 to inform the user 41 that the network provisioning metadata 32 exists and is ready to be provided to the network environment provisioner 14.

Figure 6:
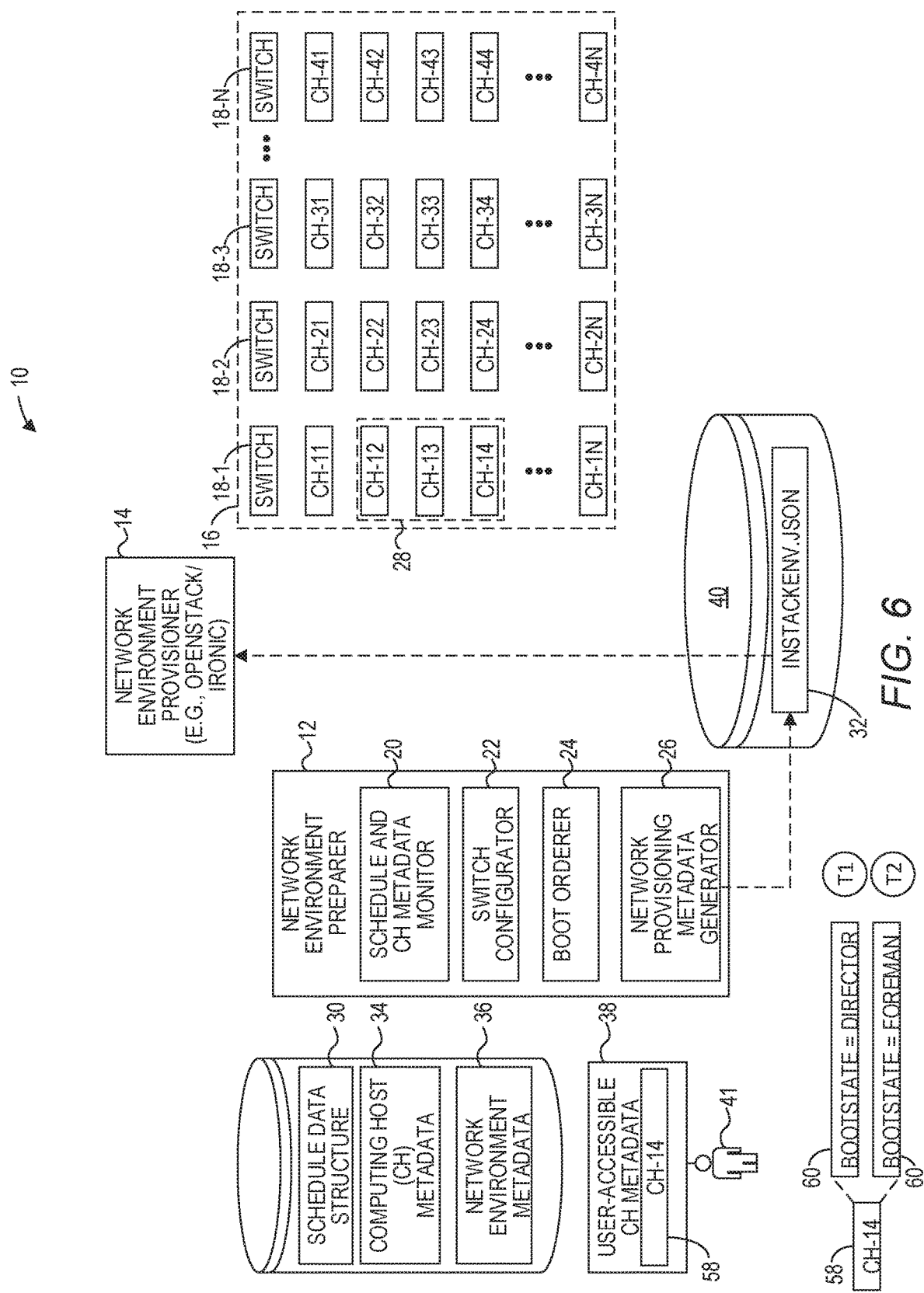
FIG. 6 is a block diagram of the environment shown in FIG. 1, illustrating how changes can be made to a new network environment, either before or after the new network environment has been created.

FIG. 6 is a block diagram of the environment 10 illustrating how changes can be made to the new network environment 28, either before or after the new network environment 28 has been created. Even after the network environment provisioner 14 has generated the new network environment 28, the network environment preparer 12 continually monitors network environment metadata associated with the new network environment 28, such as, by way of non-limiting example, the schedule data structure 30, the computing host metadata 34, the network environment metadata 36, and the user-accessible CH metadata 38, to determine if any metadata has changed. In this example, the user 41 has access to the user-accessible metadata 38. In some examples, the user-accessible metadata 38 may be part of an inventory tool, or life-cycle management tool, such as Foreman (www.theforeman.org/). In this example, an entry 58 in the user-accessible metadata 38 corresponds to the computing host CH-14. Metadata 60 in the entry 58 relates to a bootstate of the computing host CH-14. The user 41 may change the bootstate, in this example, from a DIRECTOR bootstate to a FOREMAN bootstate, or vice versa, at any point in time.

In this example, the bootstate affects two aspects of a computing host CH. If the bootstate is set to DIRECTOR, this is an indication that the computing host CH should be included in the new network environment 28, and an indication of a predetermined boot order of the network interfaces of the computing host CH. If the bootstate is set to FOREMAN, this is an indication that the computing host CH should not be included in the new network environment 28 (or removed from the new network environment 28), and is also an indication of a different predetermined boot order of the network interfaces of the computing host CH. It will be appreciated that these two different aspects could be controlled via two different pieces of metadata rather than one.

As an example of post environment processing, assume that the network environment provisioner 14 has generated the new network environment 28 and that the user 41 is using the new network environment 28 for testing purposes. At a point in time, the user 41 decides to remove the computing host CH-14 from the new network environment 28. The user 41 accesses the user-accessible CH metadata 38 and alters the entry 58 to change the bootstate from DIRECTOR, at time T1, to FOREMAN at time T2.

The network environment preparer 12 detects the change in the bootstate metadata in the entry 58. This may occur relatively quickly based on a periodic interval at which the network environment preparer 12 examines the metadata associated with the new network environment 28, including the schedule data structure 30, the computing host metadata 34, the network environment metadata 36, and the user-accessible CH metadata 38. In some examples, the periodic interval is one minute, in which case the network environment preparer 12 detects the change in the bootstate within one minute of the user 41 making the change.

The network environment preparer 12, upon detecting the change in the bootstate metadata, automatically generates new network provisioning metadata that corresponds to the change. In particular, in this example, the network environment preparer 12 generates new network provisioning metadata that omits the host computer CH-14 from the new network environment 28. The network environment preparer 12 then sends a notification to the designated user that the new network provisioning metadata has been generated and is ready to be processed by the network environment provisioner 14.

In other examples, computing hosts CH may be added or removed from the new network environment via changes to the schedule data structure 30. In particular, an operator may modify the schedule data structure 30, even after the new network environment 28 has been generated, to add additional computing hosts CH to the new network environment 28, or to remove computing hosts CH from the new network environment 28. Again, upon detecting this change, the network environment preparer 12 generates new network provisioning metadata that omits the removed computing hosts CH, or adds entries to include new computing hosts CH. The network environment preparer 12 then sends a notification to the designated user 41 that the new network provisioning metadata has been generated and is ready to be processed by the network environment provisioner 14.

Figure 7:
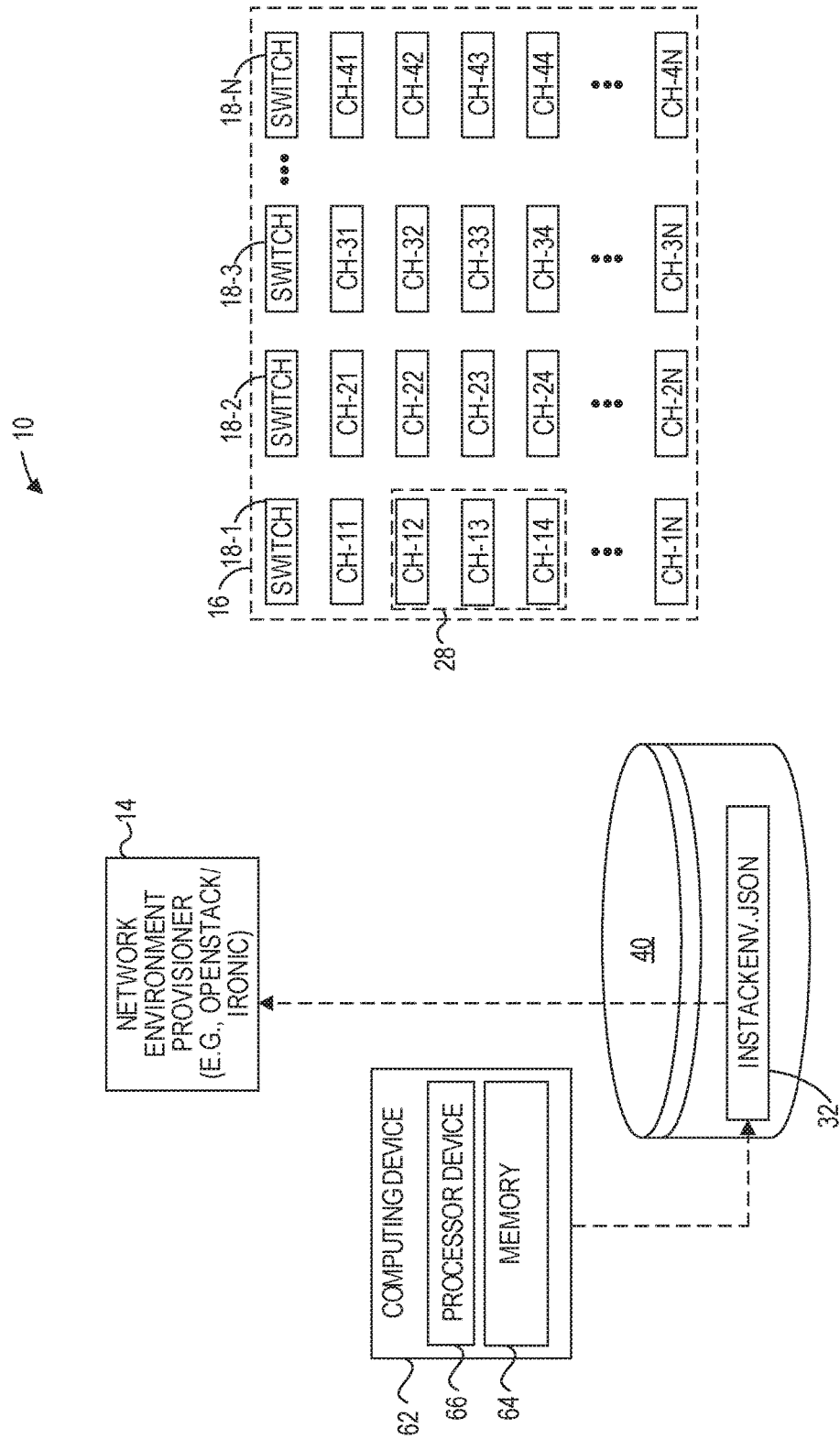
FIG. 7 is a simplified block diagram of the environment illustrated in FIGS. 1 and 6, according to one example.

FIG. 7 is a simplified block diagram of the environment 10 illustrated in FIGS. 2 and 6, according to one example. In this example, the environment 10 includes a computing device 62, which has a memory 64 and a processor device 66. The processor device 66 is coupled to the memory 64 and is to automatically determine that the new network environment 28 is designated for creation. The processor device 66 identifies the subset of computing hosts CH-12, CH-13, and CH-14 from the pool 16 of computing hosts CH for the new network environment 28. The processor device 66 determines network provisioning metadata 32 for each computing host CH. The network provisioning metadata 32 for each computing host CH includes the communication address of the baseboard management controller that controls the computing host CH and includes authentication credentials that authorize communication with the baseboard management controller. The processor device 66 stores, on the storage device 40, the network provisioning metadata 32 in a predetermined format associated with the network environment provisioner 14.

Figure 8:
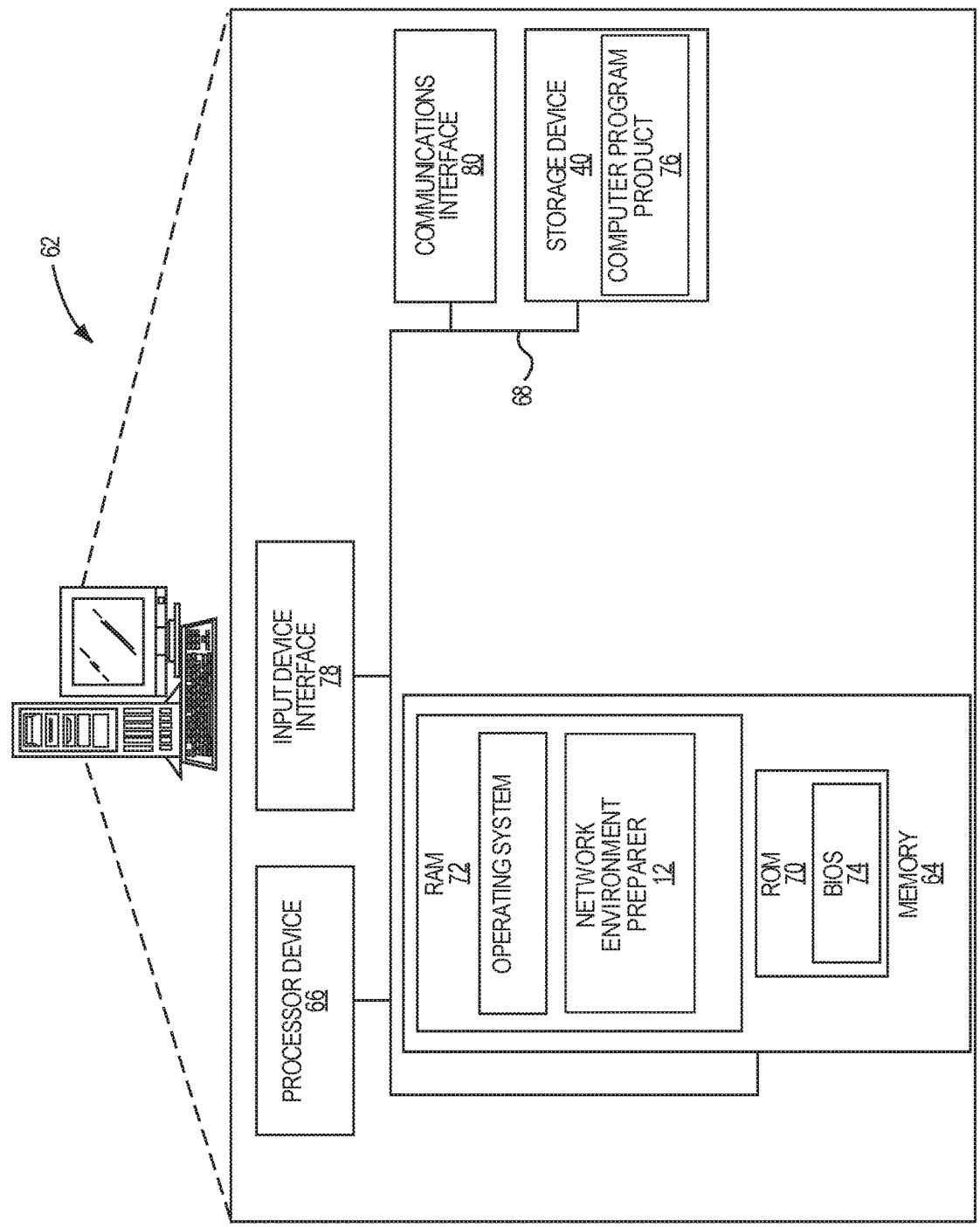
FIG. 8 is a block diagram of a computing device suitable for implementing examples according to one example.

FIG. 8 is a block diagram of the computing device 62 suitable for implementing examples according to one example. The computing device 62 may comprise any computing or electronic device capable of including firmware, hardware, and/or executing software instructions to implement the functionality described herein, such as a computer server, a desktop computing device, a laptop computing device, or the like. The computing device 62 includes the processor device 66, the system memory 64, and a system bus 68. The system bus 68 provides an interface for system components including, but not limited to, the system memory 64 and the processor device 66. The processor device 66 can be any commercially available or proprietary processor.

The system bus 68 may be any of several types of bus structures that may further interconnect to a memory bus (with or without a memory controller), a peripheral bus, and/or a local bus using any of a variety of commercially available bus architectures. The system memory 64 may include non-volatile memory 70 (e.g., read-only memory (ROM), erasable programmable read-only memory (EPROM), electrically erasable programmable read-only memory (EEPROM), etc.), and volatile memory 72 (e.g., random-access memory (RAM)). A basic input/output system (BIOS) 74 may be stored in the non-volatile memory 70 and can include the basic routines that help to transfer information between elements within the computing device 62. The volatile memory 72 may also include a high-speed RAM, such as static RAM, for caching data.

The computing device 62 may further include or be coupled to a non-transitory computer-readable storage medium such as the storage device 40, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 40 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 40 and in the volatile memory 72, including an operating system and one or more program modules, such as the network environment preparer 12, which may implement the functionality described herein in whole or in part.

All or a portion of the examples may be implemented as a computer program product 76 stored on a transitory or non-transitory computer-usable or computer-readable storage medium, such as the storage device 40, which includes complex programming instructions, such as complex computer-readable program code, to cause the processor device 66 to carry out the steps described herein. Thus, the computer-readable program code can comprise software instructions for implementing the functionality of the examples described herein when executed on the processor device 66. The processor device 66, in conjunction with the network environment preparer 12 in the volatile memory 72, may serve as a controller, or control system, for the computing device 62 that is to implement the functionality described herein.

An operator may also be able to enter one or more configuration commands through a keyboard (not illustrated) or a pointing device such as a mouse (not illustrated). Such input devices may be connected to the processor device 66 through an input device interface 78 that is coupled to the system bus 68 but can be connected by other interfaces such as a parallel port, an Institute of Electrical and Electronic Engineers (IEEE) 1394 serial port, a Universal Serial Bus (USB) port, an infrared (IR) interface, and the like.

The computing device 62 may also include a communications interface 80 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
automatically determining, by a computing device comprising a processor device, that a new network environment is designated for creation;
identifying, by the computing device, a subset of computing hosts from a pool of computing hosts for the new network environment;
determining, by the computing device, network provisioning metadata for each computing host of the subset of computing hosts, the network provisioning metadata for each computing host comprising:
a communication address of a baseboard management controller that controls the computing host; and
authentication credentials that authorize communication with the baseboard management controller; and
storing, on a storage device, the network provisioning metadata in a predetermined format associated with a network environment provisioner.

2. The method of claim 1 further comprising formatting the network provisioning metadata in the predetermined format.

3. The method of claim 1 wherein determining the network provisioning metadata for each computing host further comprises determining a media access control address of a particular network interface of a plurality of network interfaces of the computing host for provisioning.

4. The method of claim 1 wherein automatically determining that the new network environment is designated for creation comprises:
automatically monitoring a schedule data structure over time, the schedule data structure identifying a plurality of future points in time at which a corresponding plurality of new network environments is to be generated; and
based on a current point in time and the schedule data structure, determining that the new network environment is to be designated for creation.

5. The method of claim 1 further comprising:
over a period of time, determining that a plurality of new network environments is designated for creation;
identifying, for each respective new network environment, a different subset of computing hosts from a pool of computing hosts for the respective new network environment;
determining, for each respective new network environment, network provisioning metadata for each computing host in the respective subset of computing hosts;
storing, for each respective new network environment, different network provisioning metadata in the predetermined format; and
notifying, for each respective new network environment, a user associated with the respective new network environment that the respective new network environment is ready to be generated.

6. The method of claim 1 further comprising:
for at least some computing hosts in the subset of computing hosts:
determining a current boot order of a plurality of network interfaces of a computing host that determines from which network interface of the plurality of network interfaces the computing host will boot;
determining that a preferred boot order of the plurality of network interfaces differs from the current boot order; and
initiating a boot order rearrangement process to change the current boot order of the plurality of network interfaces to make the current boot order the preferred boot order.

7. The method of claim 1 further comprising:
determining at least one switch that is coupled to the subset of computing hosts;
determining a designated virtual local area network (VLAN) architecture of a plurality of different VLAN architectures; and
initiating one or more commands to the at least one switch to configure the at least one switch to have the designated VLAN architecture.

8. The method of claim 1 further comprising:
determining a designated user of a plurality of different users that is an owner of the new network environment; and
sending a notification to the designated user that the new network environment is prepared and ready to be generated by the network environment provisioner.

9. The method of claim 8 further comprising:
generating a link that points to the network provisioning metadata; and
including the link in the notification.

10. The method of claim 8 further comprising:
subsequent to the network environment provisioner provisioning the new network environment based on the network provisioning metadata, monitoring metadata associated with the new network environment;
determining that the metadata associated with the new network environment has changed;
automatically generating new network provisioning metadata that corresponds to the change; and
sending a notification to the designated user that the new network provisioning metadata has been generated and is ready to be processed by the network environment provisioner.

11. The method of claim 10 wherein determining that the metadata associated with the new network environment has changed comprises determining that a computing host of the subset of computing hosts has been designated to be removed from the new network environment; and
wherein automatically generating the new network provisioning metadata that corresponds to the change comprises automatically generating new network provisioning metadata that omits any reference to the computing host that has been designated to be removed.

12. The method of claim 10 wherein determining that the metadata associated with the new network environment has changed comprises determining that an additional computing host is to be added to the new network environment; and
wherein automatically generating the new network provisioning metadata that corresponds to the change comprises automatically generating the new network provisioning metadata to include network provisioning metadata that identifies the additional computing host.

13. A computing device, comprising:
a memory; and
a processor device coupled to the memory to:
automatically determine that a new network environment is designated for creation;
identify a subset of computing hosts from a pool of computing hosts for the new network environment;
determine network provisioning metadata for each computing host of the subset of computing hosts, the network provisioning metadata for each computing host comprising:
a communication address of a baseboard management controller that controls the computing host; and
authentication credentials that authorize communication with the baseboard management controller; and
store, on a storage device, the network provisioning metadata in a predetermined format associated with a network environment provisioner.

14. The computing device of claim 13 wherein to automatically determine that the new network environment is designated for creation the processor device is further to:
automatically monitor a schedule data structure over time, the schedule data structure identifying a plurality of future points in time at which a corresponding plurality of new network environments is to be generated; and
based on a current point in time and the schedule data structure, determine that the new network environment is to be designated for creation.

15. The computing device of claim 13 wherein the processor device is further to:
over a period of time, determine that a plurality of new network environments is designated for creation;
identify, for each respective new network environment, a different subset of computing hosts from a pool of computing hosts for the respective new network environment;
determine, for each respective new network environment, network provisioning metadata for each computing host in the respective subset of computing hosts;
store, for each respective new network environment, different network provisioning metadata in the predetermined format; and
notify, for each respective new network environment, a user associated with the respective new network environment that the respective new network environment is ready to be generated.

16. The computing device of claim 13 wherein the processor device is further to:

for at least some computing hosts in the subset of computing hosts:
  determine a current boot order of a plurality of network interfaces of a computing host that determines from which network interface of the plurality of network interfaces the computing host will boot;
  determine that a preferred boot order of the plurality of network interfaces differs from the current boot order; and
  initiate a boot order rearrangement process to change the current boot order of the plurality of network interfaces to make the current boot order the preferred boot order.

17. The computing device of claim 13 wherein the processor device is further to:
  determine at least one switch that is coupled to the subset of computing hosts;
  determine a designated virtual local area network (VLAN) architecture of a plurality of different VLAN architectures; and
  initiate one or more commands to the at least one switch to configure the at least one switch to have the designated VLAN architecture.

18. A computer program product stored on a non-transitory computer-readable storage medium and including instructions to cause a processor device to:
  automatically determine that a new network environment is designated for creation;
  identify a subset of computing hosts from a pool of computing hosts for the new network environment;
  determine network provisioning metadata for each computing host of the subset of computing hosts, the network provisioning metadata for each computing host comprising:
    a communication address of a baseboard management controller that controls the computing host; and
    authentication credentials that authorize communication with the baseboard management controller; and
  store, on a storage device, the network provisioning metadata in a predetermined format associated with a network environment provisioner.

19. The computer program product of claim 18 wherein to automatically determine that the new network environment is designated for creation the instructions further cause the processor device to:
  automatically monitor a schedule data structure over time, the schedule data structure identifying a plurality of future points in time at which a corresponding plurality of new network environments is to be generated; and
  based on a current point in time and the schedule data structure, determine that the new network environment is to be designated for creation.

20. The computer program product of claim 18 wherein the instructions further cause the processor device to:
  over a period of time, determine that a plurality of new network environments is designated for creation;
  identify, for each respective new network environment, a different subset of computing hosts from a pool of computing hosts for the respective new network environment;
  determine, for each respective new network environment, network provisioning metadata for each computing host in the respective subset of computing hosts;
  store, for each respective new network environment, different network provisioning metadata in the predetermined format; and
  notify, for each respective new network environment, a user associated with the respective new network environment that the respective new network environment is ready to be generated.

* * * * *